United States Patent [19]
Koji

[11] 3,894,720
[45] July 15, 1975

[54] CHAIN BLOCK

[75] Inventor: Nishimura Koji, Ritto, Japan

[73] Assignee: Kabushiki Kaisha TOA Kikai Seisakusho, Osaka, Japan

[22] Filed: Feb. 11, 1974

[21] Appl. No.: 441,448

[30]  Foreign Application Priority Data
  May 14, 1973  Japan .................... 48-57139

[52] U.S. Cl. ............. 254/171; 74/606; 74/421 R
[51] Int. Cl.² ................................... B66D 1/04
[58] Field of Search ......... 254/171, 167, 192, 193, 254/196, 195; 74/421 R, 606, 363, 308; 310/42

[56]  References Cited
  UNITED STATES PATENTS

| | | | |
|---|---|---|---|
| 788,606 | 5/1905 | Scott et al. | 254/171 |
| 1,949,920 | 3/1934 | Robertson | 254/171 |
| 2,596,794 | 5/1952 | Schmitter | 74/421 R |
| 2,762,232 | 9/1956 | Bade | 74/606 |
| 2,892,357 | 6/1959 | Bachman | 74/421 R |
| 2,936,644 | 5/1960 | Miller | 74/606 |
| 2,970,491 | 2/1961 | Bertsch | 74/421 R |
| 3,363,477 | 1/1968 | Curtiss et al. | 74/421 R |
| 3,368,264 | 2/1968 | Wilkinson | 74/606 |
| 3,728,906 | 4/1973 | Takaki et al. | 74/421 R |

*Primary Examiner*—Robert J. Spar
*Assistant Examiner*—Kenneth Noland
*Attorney, Agent, or Firm*—Holman & Stern

[57]  ABSTRACT

The chain block includes a holding frame having bearings to support intermediate gear of reduction gears mechanisms mounted on one of a pair of side plates. The frame is formed into a channel shape so as to cover the reduction gear mechanisms and is positioned by the projections at the ends of both legs of the holding frame being brought into engagement with the engagement holes in the side plate and fixed to the side plate by being pressed against the side plate by a gear cover mounted on the side plate so as to maintain a stable rotation of the intermediate gears. A brake cover and a hand sprocket cover mounted on the other of the pair of side plates are constructed so as to be simultaneously fastened to the other side plate and include engagement means by which both covers are brought into engagement with each other by the simultaneous fastening.

8 Claims, 8 Drawing Figures

CHAIN BLOCK

BACKGROUND OF THE INVENTION

This invention relates to improvements in a chain block and more particularly to improvements in a bearing mechanism and an assembling structure.

In a chain block, consideration is given to the holding of reduction gears of the block, especially to positioning of two sets of intermediate gears contained in the reduction gears so as to assure normal rotation of the intermediate gears by maintaining parallelism between a side plate having the reduction gears mounted thereon and support members supporting the other ends of the shafts of the intermediate gears thereon. But it is a general practice that the support members are mounted on a gear cover secured through three stay bolts to the side plate. The gear cover is made of sheet iron because the sheet iron is easy to be press worked and because the weight of a chain block is saved, and accordingly the gear cover lacks rigidity and it is difficult for the cover to firmly hold the support members. On the other hand, the chain block, because it is mostly used for loading and unloading, it is frequently very roughly handled, and accordingly the gear cover is subject to deformation, which in turn dislocates the parallelism of the support members to thereby hamper smooth rotation of the intermediate gears. In order to prevent the dislocation of the parallelism of the intermediate gears, there is no alternative but to increase the thickness of the gear cover. If the gear cover is increased in thickness, it becomes exceedingly difficult to press work the cover and moreover the increased weight of the chain block make it more inconvenient to handle. The fact that the support members, namely, members which become bearings for the intermediate gears are fixed to the inside surface of the gear cover means that fitting of the shafts of the intermediate gears into the bearing holes in assembling the chain block must be carried out entirely by fumbling, and accordingly it cannot be ascertained by the eye whether the shafts are fitted normally or not and thus assembly work is greatly decreased in efficiency.

On the other hand, in the chain block, a hand sprocket cover and a cover of a brake portion that interlocks with the hand sprocket are mounted on the side plate opposite to the gear cover so as to protect the brake portion against dust, water, etc. And the brake cover was eighter fixed by rivets to the side plate or was fixed together with the hand sprocket cover to the side plate by forming the stay bolts for fixing the hand sprocket cover into stepped stay bolts. But when rivets are used for fixing the brake cover, rivet holes are formed both in the side plate and in the cover, and caulking must be carried out after the plate and the cover were assembled. Accordingly, the assembling work requires much labor, while, in fixing the brake cover and the hand sprocket cover by means of the stepped stay bolts, the method is employed in which first the brake cover is laid over the side plate and the stepped stay bolts are inserted through the brake cover and the side plate with the brake cover pressed against the side plate by the stepped portions of the stay bolts and nuts are fitted over the threads of the stay bolts extending between the side plate and that side plate on the side of the gear cover and are tightened and thereafter the hand sprocket cover is fixed. But because the space between said both side plates is narrow, working efficiency with respect to threaded engagement of the nuts with the stay bolts is very bad.

Furthermore, such a method is generally employed in the fitting structure of a hanging hook of the chain block as the one in which a headed pin is inserted through the yoke of the hook fitted between said both side plates and through said both side plates and the headed pin is fixed by a split pin radially to both side plates or the pin that pierces through the yoke is formed into a stepped pin and both ends of the pin are fitted into said both side plates. The structure of the kind described not only involves cumbersome working and assembling, but is not free from disadvantages in the strength of the fitting structure of the hook. Also, as a particular type of use of a chain block, there is a case in which the use of a standard type hook is replaced with that of a cross armed hook to thereby double weight lifting force. When the hanging hook is replaced for such a purpose, the structure of the type described makes it necessary to remove the gear cover, speed reduction mechanisms and the side plates on the side of the mechanisms in order to remove the pin, with the accompanying disadvantage that the replacement operation is very cumbersome.

SUMMARY OF THE INVENTION

An object of this invention is to provide a chain block which is made extremely easy not only to work and assemble during manufacturing but also to disassemble and assemble in time of use.

Another object of the invention is to strongly form a support structure of the reduction gear mechanisms of the chain block, especially a support structure of the intermediate gears of the reduction gears mechanisms.

Another object of the invention is to simplify the structure by which to fix a brake cover and a hand sprocket cover.

Yet another object of the invention is to simplify a structure for fixing a hanging hook, strengthen the structure, and facilitate disassembling and assembling of the hook.

According to the invention, shafts of reduction gears mechanisms, particularly the shafts of intermediate gears of the mechanisms each have their one end supported in a bearing on the side plate having the reduction gears mounted thereon, in the same manner as a conventional chain block, and have their other end supported in a bearing on a channel-shaped holding frame which is designed to have the front ends of two plate-shaped legs engaged with said side plate so as to position the holding frame and is designed to have the back side pressed by a gear cover against the side plate.

The holding frame has a plate thickness strong and rigid enough to support the ends of shafts of the intermediate gears so as to firmly support the intermediate gears in bearings and assure stabilized rotation. Before the gear cover is fixed to the side plate, the holding frame is brought into engagement with the side plate and positively supports the intermediate gears, and before fixing of the gear cover, the intermediate gears are stably supported in bearings in such a manner as to permit the visual confirmation of the state in which the gears are supported, thus making the fitting of the gear cover extremely easy. It is possible to form the gear cover of as thin a sheet of iron as possible so that there is not only no possibility of the holding frame increasing the weight of the entire chain block, but also the gear cover is reinforced by the holding frame and there is no fear of the bearing structure of the intermediate gears being deformed even if the gear cover is deformed by outside force, with the result that rotation of the intermediate gears is stabilized for a long time.

Furthermore, in removing the gear cover, there is no possibility of the intermediate gears being displaced in position, and accordingly the operation efficiency, for example, in the supply of grease or the like is extremely improved.

Furthermore, according to the invention, when the brake cover and hand sprocket cover are fixed to the side plate on the brake side, the brake cover is formed with a portion that is engaged with the hand sprocket cover and stay bolts are used, each having the straight shank that pierces through said both covers at the same time. Thus, said both covers are at the same time fixed to the side plate and assembling is greatly simplified. And said stay bolts, as will be shown in an embodiment to be presently described, can be constructed in such a manner as to pierce through both covers and the side plate and further through the side plate on the side of the reduction gears and through the gear cover. And in this case, the stay bolts can be constructed in the manner that they are formed with steps and spacing between both side plates are positively and firmly held.

Furthermore, the fixing pin of the hanging hook in the invention is made in the form of a straight pin shaft that pierces through the yoke of the hook and both side plates, and the pin shaft is prevented from axial movement with one end thereof bearing against the inside surface of the brake cover and with the other end thereof bearing against the inside surface of the gear cover. Thus, the fitting structure of the hanging hook is extremely simplified and the number of the parts of hook used is decreased and moreover in the replacement of the hook, the mere removal of the gear cover makes it possible to draw out the aforestated pin and thus the operation efficiency with respect to disassembling and assembling is greatly improved.

Other objects and features of this invention will become more apparent as a description of the invention will proceed.

DESCRIPTION OF THE PREFERRED EMBODIMENT

Figure 1:
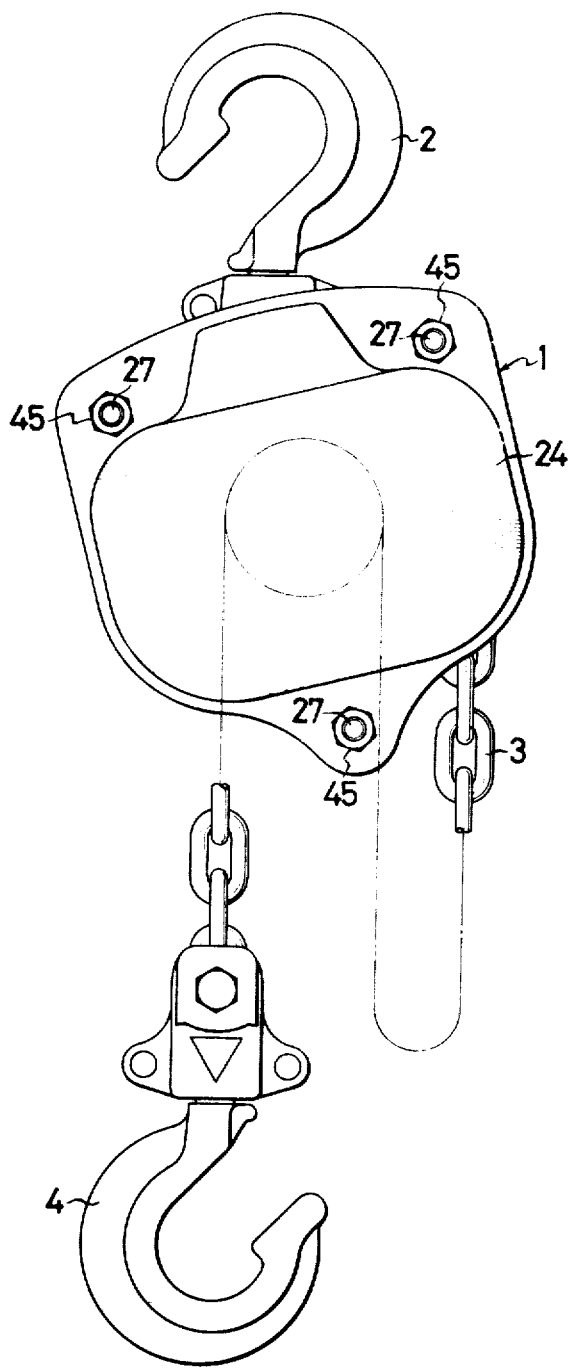
FIG. 1 is a front view schematically showing the outside appearance of a chain block.

A chain block, as its outside appearance is schematically shown in FIG. 1, includes a hanging hook 2 fixed to its main body 1 and a load hanging hook 4 fixed through a load chain 3 to the body 1, and as well known, a load hung by the hanging hook 4 can be vertically transferred by hanging the hanging hook 2 at a suitable place of a work place directly or through a wire rope or the like and operating a hand chain (not shown) to thereby move the hook 4 vertically.

Figure 2:
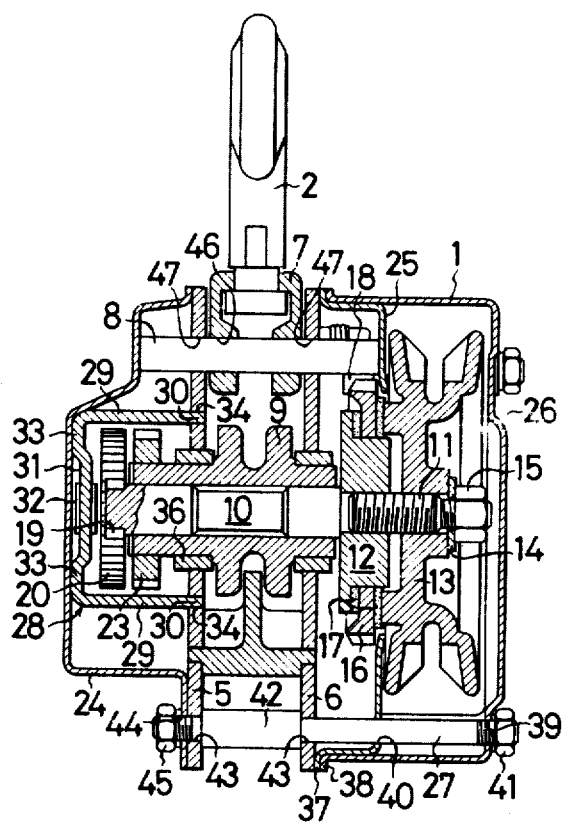
FIG. 2 is a longitudinal cross sectional view showing the essential part of one embodiment of the invention.

As shown in detail in FIG. 2, the main body 1 includes a yoke fitted between two side plates 5 and 6, said yoke 7 having the hanging hook 2 rotatably attached thereto and being pivotally mounted between the side plates 5 and 6 by a pin shaft 8 piercing through the plates 5 and 6 and the yoke 7.

Between said both side plates 5 and 6 is also disposed a load sprocket 9 with which the aforestated load chain 3 is brought into meshing, said sprocket being rotatably supported in a bearing between the side plates 5 and 6. In the hole of the load sprocket there is inserted and rotatably supported, a pinion shaft 10. The pinion shaft 10 is formed at one end with a multiple thread screw 11 over which a brake hub 12 and a hand sprocket 13 are threadedly fitted and the hand sprocket 13 is prevented from falling off the screw 11 by means of a washer and a nut 15.

Between the brake hub 12 and the hand sprocket 13 are clamped a ratchet wheel 16 and two brake disks 17 sandwiching the ratchet wheel 16 therebetween, and a pawl 18 fixed to the side plate 6 so as to mesh with the ratchet wheel 16 cooperates with the ratchet wheel 16 in preventing the brake mechanism from being reversely rotated by the load that acts on the hanging hook 4.

Figure 3:
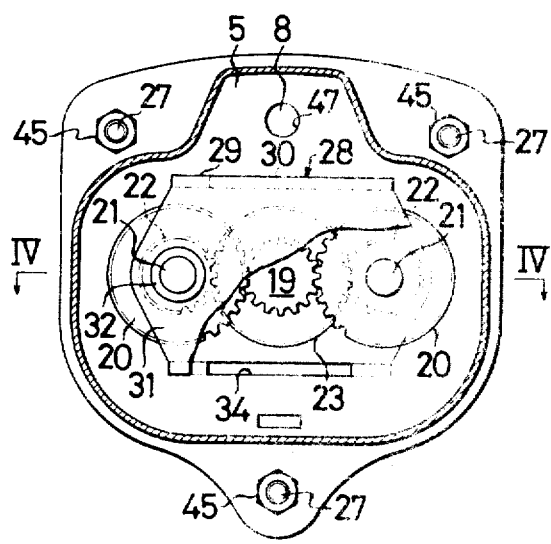
FIG. 3 is a front view, partly broken, showing the reduction gears mechanisms.
Figure 4:
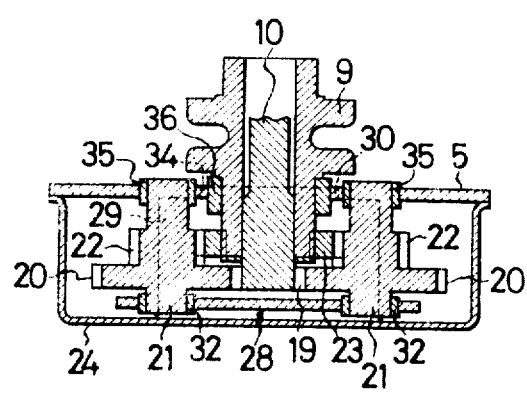
FIG. 4 is cross-sectional plan view taken along line IV—IV of FIG. 3.
Figure 5:
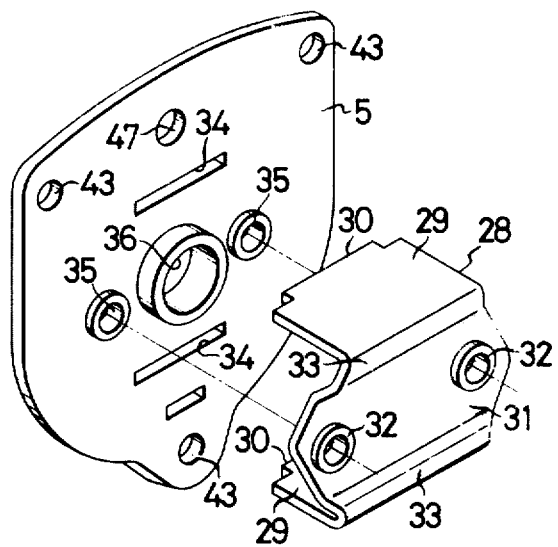
FIG. 5 is a perspective view of a structure supporting the reduction gears mechanisms.

The pinion shaft 10 is integrally formed at the other end with a pinion 19 which meshes with two larger diameter intermediate gears 20 disposed symmetrically around the shaft 10, and two small diameter intermediate gears 22 mounted on the same shaft 21 so as to rotate integrally with the gears 20 mesh with a load gear 23 fixed to the shaft end of the load sprocket 9 and transmit the rotation of the hand sprocket 13 to the load sprocket 9 (FIGS. 3 and 4).

A gear cover 24, brake cover 25 and hand sprocket cover 26 are fixed to both side plates 5 and 6 by a suitable number (generally three) of stay bolts 27.

In the above is provided a holding frame 28 covering a reduction gear mechanism unit consisting of a pinion 19, intermediate gears 20 and 22, and a load gear 23. The holding frame 28 is made of plate iron bent into a channel shape, the plate iron having the thickness of suitable rigidity and strength sufficient to stably maintain the rotation of the gears 20 and 22, and is formed at the ends of both its leg portions 29 with projections 30 and at the bottom plate portion 31 with bearings 32 for two shafts 21, the bottom plate portion 31 being formed at both its bent edge portions with suitable projecting lines 33.

On the other hand, the side plate 5 on which the reduction gear mechanisms are mounted is formed with slits 34 or holes with which the projections 30 are engaged, and the holding frame 28 is positively fixed so as to prevent the frame 28 from moving along the surface of the side plate 5 by bringing the projections 30 of the holding frame 28 supporting the shafts 21 into engagement in the slits 34. And in assembling the holding frame 28, there is no inconvenience in fitting the intermediate gear shafts 21 into the bearings 32, and exactness and rigidity of the supporting structure of the frame 28 is greatly improved by it being made possible to visually ascertain how the shafts 21 are supported by the holding frame 28 and by the shafts 21 being supported between the side plate 5 and the holding frame 28.

After the holding frame 28 has been fixed to the side plate 5, the gear cover 24 is fixed by stay bolts 27. The gear cover thus fixed to the side plate 5 presses the projecting lines 33 of the holding frame 28 by the inside surface of the gear cover to thereby press the frame 28 against the side plate 5 so as to prevent the projections 30 from escaping from the slits 34 and to securely fix the holding frame 28. In fixing the gear cover, there is no such cumbersome operation as fumbling for fitting the intermediate gear shafts 21 through bearings into the holding member, etc. inside of the gear cover. Also, the state in which the holding frame 28 is fixed can be maintained stable even if there is slight deformation and slack in binding force in the gear cover 24. The numeral 35 designates bearings for intermediate gears and 36 designates a bearing for a load sprocket.

The holding frame 28, where necessary, may be formed with bearings for other gears 19 and 23. The shape, number, and position of formation, etc. of projections 30 in the legs 29 of the holding frame 28 may be optionally decided, and the slits 34 of the side plate 5 may also freely vary in the shape, number, and position of formation in accordance with the projections 30. And engagement of the projections 30 with the slits 34 may answer the purpose so far as the engagement ultimately serves to prevent the discrepancy in the position of the holding frame 28, and accordingly as the case may be, the slits 34 or holes corresponding thereto for receiving the projections 30 need not be through holes.

The projection lines 33 formed on the back side of the holding frame 28 are brought into contact with the inside surface of the gear cover 24 by the cover being fastened to the side plate 5 and are subject to binding force by the cover 24 to thereby serve to make the holding frame 28 held firmly by the side plate 5 and to prevent the bearings 32 for intermediate gears from being brought into contact with the inside surface of the gear cover 24. On the other hand, instead of forming said projecting lines 33 on the holding frame 28, formation of projecting lines on the inside surface of the gear cover 24 could produce the same effect, and in the event of forming projecting lines on the gear cover 24, it is possible to make the projecting lines serve also to reinforce the cover 24 by forming the lines into a suitable shape.

Figure 6:
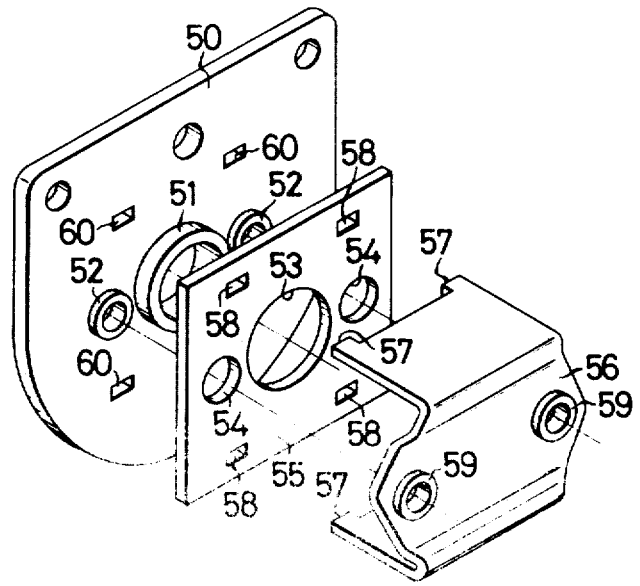
FIG. 6 is a perspective view of an equivalent of FIG. 5 in another embodiment of the invention.

FIG. 6 shows one embodiment of another fitting structure of the holding frame, in which there is provided an auxiliary plate 55 adapted to be laid over a side plate 50 by fitting the positioning holes 53 and 54 of the plate 55 over the bearings 51 and 52 for the reduction gears mechanisms mounted on the side plate 50, and side plate 55 being formed with engagement holes 58 adapted to mesh with the projections 57 of a holding frame 56.

Since the auxiliary plate 55 is prevented from planar movement on the side plate 50 by the engagement of its holes 53 and 54 with the bearings 51 and 52, the frame 56 having the projections 57 engaged with the holes 58 of the auxiliary plate 55 are likewise fixed firmly to the side plate 50 through the auxilairy plate 55. And the auxiliary plate 55 and the holding frame 56 are pressed against the side plate 50 by fixing of the gear cover and are completely fixed to the plate 50. The numeral 59 designates bearings for the intermediate gears provided in the holding frame 56.

In this case, there is no need of forming holes in the side plate 50 for engaging with the projections 57 of the holding frame 56, and only when the thickness of the auxiliary plate 55 with respect to the projecting length of the projections 57 is small, it is merely necessary to form holes 60 for encasement of the ends of the projections 57 which pierce through the engagement holes 58 of the auxiliary plate 55, and the holes 60 may be ones large enough to loosely receive the projections 57 therein.

Accordingly, the embodiment illustrated is useful when the large thickness of the side plate 50 makes it difficult to form engagement holes adapted to suitably engage with the projections 57. Also, the thickness of the auxiliary plate 55 may be selected only for the purpose of fixing the holding frame 56 and therefore, freedom in selecting the thickness of the plate 55 is great.

Figure 7:
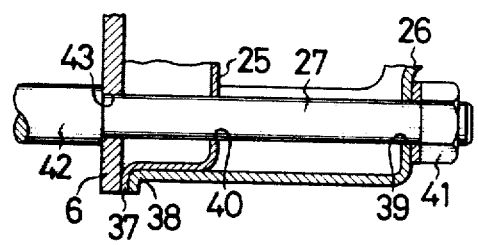
FIG. 7 is an enlarged longitudinal sectional view showing the essential part of the assembling structure of a brake cover and a sprocket cover.

According to the structure by which a brake cover 25 and a hand sprocket cover 26 are fastened to the other side plate 6, the brake cover 25 is formed with an outward flange 37 on the end edge, on which the cover 25 is brought into contact with the plate 6, as shown in FIGS. 2 and 7, said flange 37 being constructed so as to be engageable with the circumferential edge 38 of the hand sprocket cover 26 disposed outside of the flange 37.

The stay bolts 27 by which to fasten the sprocket cover 26 to the side plate 6 pierce through the bolt holes 39 of the hand sprocket cover 26 and also through the bolt holes 40 of the brake cover 25, and nuts 41 are fitted over the bolts 27 to thereby fasten the hand sprocket cover 26 to the side plate 6 and also to securely fix the cover 25 by clamping the outward flange 37 of the brake cover 25 between the circumferential edge 38 of the cover 26 and the side plate 6.

As will be more clearly seen from FIG. 2, it is possible to provide a structure which maintains the space between the side plates 5 and 6 and simultaneous fastening of the covers 24, 25 and 26 to the side plates 5 and 6 can be realized by forming a stepped larger diameter portion 42 on each of the stay bolts 27 between the side plates 5 and 6 and by piercing the bolts 27 through the bolt holes 43 of the side plates 5 and 6 and also through the bolts holes 44 of the gear cover 24. The numeral 45 designates clamp nuts on the side of the gear cover 24.

Thus, the invention makes it possible to firmly connect both covers 25 and 26 simultaneously to the side plate 6 through such simple operation as by making the side plates 5 and 6 hold the aforestated and other required members therebetween, positioning the space between the side plates 5 and 6 by means of stay bolts 27, and thereafter first fixing the various members of the brake mechanism and other parts to the side plate 6, putting the brake cover 25 on the thus fixed members and parts, then fixing the hand sprocket 13 thereto, thereafter stretching a hand chain over the sprocket 13, putting the sprocket cover 26 thereon and finally fitting the nuts 41 over the stay bolts 27.

Figure 8:
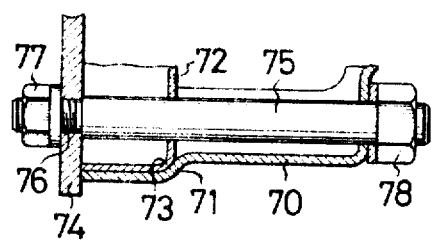
FIG. 8 is an enlarged longitudinal sectional view of another embodiment of an equivalent of FIG. 7.

Engagement of the brake cover with the hand sprocket cover may be effected, as shown in FIG. 8, by forming a stepped portion 71 on a hand sprocket cover 70 and bringing the stepped portion 71 into engagement with the shoulder 73 of the brake cover 72 so that, simultaneously with the connection of the sprocket cover 70, the shoulder 73 will be pressed to thereby fasten the brake cover 72 to the side plate 74. Furthermore, according to the embodiment shown, the stay bolts 75 is of the construction in which the stepped screw portion 76 of the bolt 75 is beforehand fixed to the side plate 74 by a nut 77, but it may be of the same construction as the one shown in FIG. 7. The numeral 78 designates a nut for fastening both covers 70 and 72.

Next, a pin shaft 8 that pierces through the hole 46 of the yoke 7, the holes 47 of the side plates 5 and 6 and fixes the hanging hook 2 to the main body 1 has one end thereof bearing against the inside surface of the brake cover 25 and has the other side thereof bearing against the inside surface of the gear cover 24, as shown in FIG. 2. The pin shaft 8 is a mere straight rod and may be such as is obtainable from a commercially available polished shaft cut into a required size and needs not machining at all such as screw cutting or step forming, etc. Moreover, when assembling, it is only necessary to insert the pin shaft through the holes 46 and 47 and to make the covers 24 and 25 support both ends of the shaft thereon. And when it is desired to replace the hanging hook with a cross armed hanging hook, mere removal of the gear cover 24 enables withdrawal of the pin shaft 8 and accordingly there is no need of such troublesome labor in disassembling and assembling as conventionally required.

I claim:

1. A chain block including:
    a pair of side plates disposed opposite to each other with a load sprocket clamped therebetween and rotatably supporting the load sprocket;
    reduction gears mechanisms mounted on one side plate of said pair of side plates and including intermediate gears adapted to bring a hand sprocket and the load sprocket into cooperative movement at reduced speed by means of mechanisms;
    a holding frame formed into a channel shape so as to cover said reduction gears mechanisms from above, below and outside, and having bearings to support those ends of shafts of at least said intermediate gears which are on the side opposite to said side plate, said holding frame having projections formed at the ends of both legs of the frame and being positioned by bringing said projections into meshing engagement with holes formed in said side plate and corresponding to the projection; and
    a gear cover covering said holding frame and said reduction gears mechanisms, said cover pressing said holding frame toward said side plate by detachable fastening means and fixing the cover by being fastened to the side plate, whereby the fastening means do not extend through the holding frame.

2. The chain block according to claim 1 wherein said holding frame is formed on its channel-shaped back side with projecting lines which bear against said gear cover.

3. The chain block according to claim 1 wherein said holding frame is positioned on said side plate by being engaged with an auxiliary plate held by the side plate.

4. A chain block including:
    a pair of side plates disposed opposite to each other with a load sprocket clamped therebetween and rotatably supporting the load sprocket;
    a pin shaft piercing through the yoke of a hanging hook fitted between said pair of side plates and connecting the yoke to said side plates;
    reduction gear mechanisms mounted on one side plate of said pair of side plates and including intermediate gears mounted between a hand sprocket and the load sprocket;
    a holding frame formed into a channel shape so as to cover said reduction gear mechanisms from above, below and outside and having bearings to support those ends of the shafts of the intermediate gears which are on the side opposite to said one side plate, said holding frame having at least one projection each formed at the ends of both legs of said frame above and below said gear mechanisms and being positioned by engaging the projections in engagement holes formed in said one side plate;
    a gear cover fastened to said one side plate covering said holding frame and said reduction gear mechanisms, said cover pressing the outside of said holding frame toward said one side plate and fixedly engaging said frame therewith by being fastened to said one side plate;
    a brake cover fastened to the other side plate of said pair of side plates;
    a hand sprocket cover fastened to said other side plate together with said brake cover;
    means for fastening said brake and hand sprocket covers simultaneously to said other side plate; and
    engagement means formed in said brake or hand sprocket cover adapted to engage said both covers with each other by the covers being fastened to said other side plate, whereby said engagement means do not extend through the holding frame.

5. The chain block according to claim 4 wherein said pin shaft connecting the yoke of the hanging hook between said pair of side plates to said both side plates pierces through said both side plates and said yoke, and is fixed with one end of said pin shaft bearing against the inside surface of said gear cover mounted on said one side plate and with the other end bearing against the inside surface of said brake cover mounted or said other side plate.

6. The chain block according to claim 4 wherein said holding frame is positioned on said one side plate by engaging the projections in the engagement holes of an auxiliary plate held by said one side plate.

7. The chain block according to claim 4 wherein said engagement means is an outward flange formed on that end edge of said brake cover which bears against said other side plate and the end edge of said hand sprocket cover is engaged with the outside surface of the outward flange, thereby pressing the flange against said other side plate and fixing said both covers simultaneously.

8. The chain block according to claim 4 wherein said engagement means is a stepped portion formed in said hand sprocket cover so as to bear against and engage with the shoulder of said brake cover, said shoulder and said stepped portion being engaged with each other and pressing said brake cover against said other side plate, thereby fixing said both covers simultaneously.

* * * * *